Feb. 14, 1939.     E. PHIPPS     2,146,912
GUARDRAIL
Filed Feb. 12, 1938
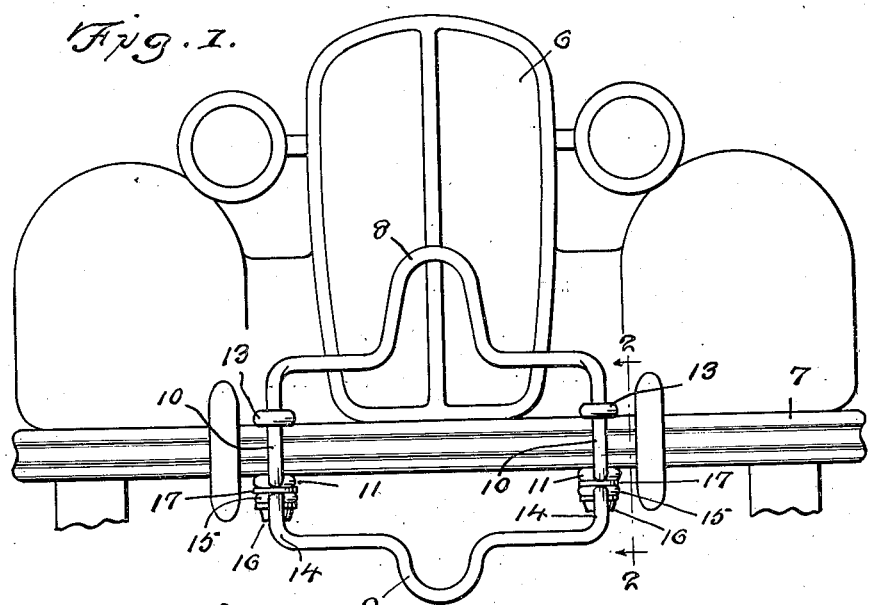
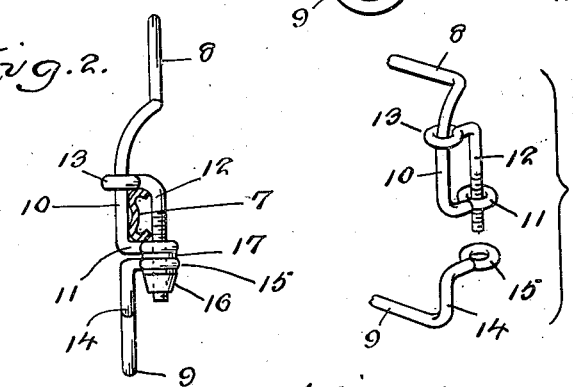
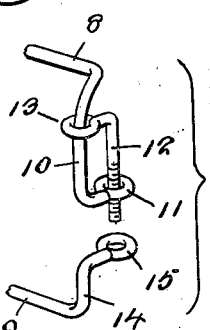
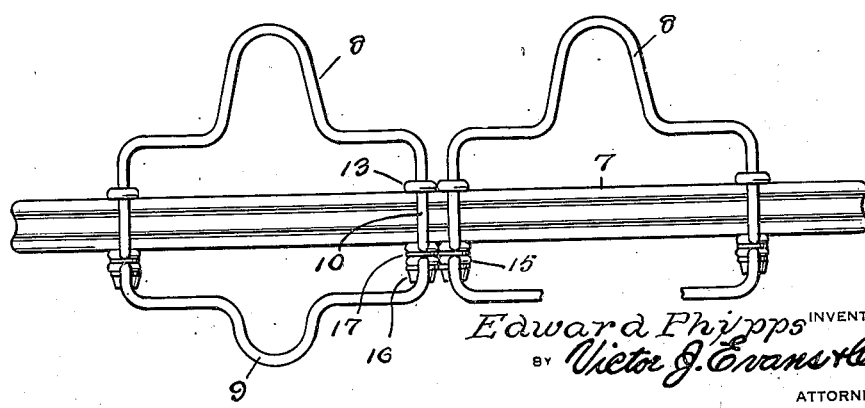
Edward Phipps INVENTOR
BY Victor J. Evans & Co.
ATTORNEYS Patented Feb. 14, 1939

2,146,912

UNITED STATES PATENT OFFICE 2,146,912

GUARDRAIL

Edward Phipps, Highland Park, Mich.

Application February 12, 1938, Serial No. 190,316

1 Claim. (Cl. 293—55)

My invention relates to new and improved guard rails for attachment to motor vehicle bumpers and the like.

One of the principal objects of my invention is to provide a guard device capable of being readily attached to motor vehicle bumpers and so designed and constructed to effect a barricaded area below as well as above the bumper.

Another object of my invention is to provide a device of the above described character which is simple in construction, easy of attachment, efficient in operation, durable in use and economical in manufacture.

Other objects and advantages will be apparent from the following description, appended claim and annexed drawing.

Referring to the drawing wherein like reference characters designate like parts throughout the several views:

Fig. 1 is a front elevation of the front of a motor vehicle illustrating my invention attached to the bumper thereof.

Fig. 2 is a sectional view taken on line 2—2 of Figure 1.

Fig. 3 is a fragmentary disassembled perspective view of the connecting sections of the invention.

Fig. 4 is a front elevation of a motor vehicle bumper illustrating a pair of my bumper guards attached thereto.

In teaching my invention there is illustrated the front of a motor vehicle equipped with the usual radiator 6 and having a front bumper 7 positioned forwardly thereof. The foregoing is descriptive of a typical construction.

My guard device comprises upper and lower guard rails 8 and 9 respectively. The upper guard rail is fashioned with a longitudinally extending section terminating at the ends thereof in perpendicular bumper engaging end sections 10 formed with laterally extending eyed sections 11 at the ends thereof. Slidable within said eyed sections 11 are bolt members 12, the upper ends of which are right angularly disposed and formed with eyed sections 13 receiving the bumper engaging sections 10.

The lower guard rail 9 is fashioned with a longitudinally extending section terminating at the ends thereof in upwardly extending sections 14 fashioned with laterally extending eyed sections 15 adapted for registery with the sections 11. Said sections 15 receive therethrough the lower ends of the bolt members 12 and are retained in connected relation thereto by means of nuts 16 threadedly engaging said bolt members as clearly illustrated in Figure 2 of the drawing.

In attached position the bumper engaging sections 10 of the rail 8 extend downwardly and engage the outer face of the bumper. The sections 11 extend inwardly beyond the rear face of the bumper. The lower ends of the bolt members 12 are inserted within the eyes of the sections 11 and extend downwardly therethrough for connection with the lower guard rail 9 by means of the nuts 16. A washer 17 is interposed between the sections 11 and 15 and serves as a wear plate therebetween.

From the foregoing it will be apparent that my device may be easily and quickly secured to a motor vehicle bumper or the like with a minimum amount of adjustment and labor without modifying the bumper construction. Furthermore, when attached my device effects a barricaded area below the bumper as well as above the same, thereby protecting the parts of the motor vehicle located in the rear of the bumper from projecting parts of other vehicles or obstacles.

As illustrated in Figure 4, if desired a plurality of the guard devices may be secured to a bumper to establish protection over a larger area in front of the motor vehicle. The bumper 7 is constructed of resilient material and coacts with the sections 11 and 13 to exert pressure on the nuts 16 thereby preventing the same from becoming loose on the member 12. By thus maintaining the parts in tensioned condition, the same are prevented from rattling or possible disconnection from each other with resultant loss.

What I claim is:

A device of the character described, comprising, in combination, a bumper, an upper guard rail fashioned with depending ends terminating in offset sections disposed against the underface of said bumper, said offset sections having eyes formed therethrough, bolt members slidable on said ends above said bumper and extending through said eyes, a lower guard rail having upwardly extending ends fashioned with offset sections having eyes registering with the first mentioned eyes and receiving said bolt members therethrough, and means carried by said bolt members locking the offset sections together whereby said bolt members coact with said bumper to maintain said guard rails connected thereto.

EDWARD PHIPPS.